(12) United States Patent
Kurihara

(10) Patent No.: US 9,969,148 B2
(45) Date of Patent: May 15, 2018

(54) DOUBLE GLAZING UNIT

(71) Applicant: ASAHI GLASS COMPANY, LIMITED, Chiyoda-ku (JP)

(72) Inventor: Kazuyuki Kurihara, Chiyoda-ku (JP)

(73) Assignee: Asahi Glass Company, Limited, Chiyoda-ku (JP)

( * ) Notice: Subject to any disclaimer, the term of this patent is extended or adjusted under 35 U.S.C. 154(b) by 268 days.

(21) Appl. No.: 14/966,396

(22) Filed: Dec. 11, 2015

(65) Prior Publication Data

US 2016/0096344 A1 Apr. 7, 2016

Related U.S. Application Data

(63) Continuation of application No. PCT/JP2014/070112, filed on Jul. 30, 2014.

(30) Foreign Application Priority Data

Aug. 5, 2013 (JP) .................................. 2013-162629

(51) Int. Cl.
*B32B 17/10* (2006.01)
*B61D 25/00* (2006.01)
(Continued)

(52) U.S. Cl.
CPC .... *B32B 17/1055* (2013.01); *B32B 17/10036* (2013.01); *B32B 17/10055* (2013.01);
(Continued)

(58) Field of Classification Search
CPC . E06B 3/66; E06B 3/67; E06B 3/6715; B32B 17/10091; B32B 17/10229; B32B 17/10055; B32B 17/10532; B32B 17/10036; B32B 17/10137; B32B 17/10431; B32B 17/10504; B32B 17/10513; B32B 17/1055; B32B 17/10761; B32B 17/10788; B32B 2419/00;
(Continued)

(56) References Cited

U.S. PATENT DOCUMENTS

| | | | |
|---|---|---|---|
| 2008/0110109 A1* | 5/2008 | Hermens | B32B 17/10045 52/171.3 |
| 2009/0176101 A1* | 7/2009 | Greenall | B32B 17/10 428/412 |
| 2012/0307337 A1* | 12/2012 | Bartug | B32B 17/10036 359/245 |

FOREIGN PATENT DOCUMENTS

| | | |
|---|---|---|
| JP | 8-26781 | 1/1996 |
| JP | 2001-83554 | 3/2001 |

(Continued)

OTHER PUBLICATIONS

International Search Report dated Oct. 28, 2014 in PCT/JP2014/070112 filed Jul. 30, 2014.

*Primary Examiner* — Donald J Loney
(74) *Attorney, Agent, or Firm* — Oblon, McClelland, Maier & Neustadt, L.L.P.

(57) ABSTRACT

A double glazing unit is constituted by exterior-side laminated glass interior-side laminated glass. The exterior-side laminated glass is configured as laminated glass including a first chemically tempered glass plate, a first interlayer and a second chemically tempered glass plate. The interior-side laminated glass is configured as laminated glass including a glass plate, a second interlayer, a light-modulating sheet, a third interlayer, and a fourth interlayer and a tempered glass.

16 Claims, 6 Drawing Sheets

(51) Int. Cl.
  *B60J 1/00* (2006.01)
  *E06B 3/66* (2006.01)
  *E06B 3/67* (2006.01)

(52) U.S. Cl.
  CPC .. *B32B 17/10091* (2013.01); *B32B 17/10137* (2013.01); *B32B 17/10201* (2013.01); *B32B 17/10229* (2013.01); *B32B 17/10431* (2013.01); *B32B 17/10504* (2013.01); *B32B 17/10513* (2013.01); *B32B 17/10532* (2013.01); *B32B 17/10761* (2013.01); *B32B 17/10788* (2013.01); *B60J 1/001* (2013.01); *B61D 25/00* (2013.01); *B32B 2307/102* (2013.01); *B32B 2307/304* (2013.01); *B32B 2419/00* (2013.01); *B32B 2605/00* (2013.01); *B32B 2605/10* (2013.01); *E06B 3/66* (2013.01); *E06B 3/67* (2013.01); *E06B 3/6715* (2013.01)

(58) Field of Classification Search
  CPC ........ B32B 2307/304; B32B 2307/102; B32B 2605/00; B32B 2605/10; B61D 25/00; B60J 1/001
  See application file for complete search history.

(56) References Cited

FOREIGN PATENT DOCUMENTS

| | | |
|---|---|---|
| JP | 2004-175622 | 6/2004 |
| JP | 2007-39299 | 2/2007 |
| JP | 3184348 U | 6/2013 |
| WO | WO 2012/157616 A1 | 11/2012 |

\* cited by examiner

DOUBLE GLAZING UNIT

TECHNICAL FIELD

The present invention relates to a double glazing unit having a light-modulating function.

BACKGROUND ART

A double glazing unit has been commonly employed as window glass for a railway vehicle in order to improve sound insulation, heat insulation and safety (see Patent Document 1 etc.). Such double glazing unit is configured by disposing an exterior-side glass plate and an interior-side glass plate through a spacer, and sealing a peripheral edge by a seal.

In the double glazing unit disclosed in Patent Document 1, a non-tempered glass plate (float glass), which has a thickness of 5 mm, has been employed as each of the exterior-side glass plate and the interior-side glass plate. By this arrangement, the double glazing unit has a strength set to a level appropriate to window glass for a railway vehicle.

Further, the exterior-side glass plate of the double glazing unit disclosed by Patent Document 1 has a self-dimming film disposed thereon. The self-dimming film is deposited on one of the two sides of the exterior-side glass plates facing the interior-side glass plate by sputtering. The self-dimming film has a function of setting the transmittance of visible light at from 70 to 90% when the light intensity from outside is low and of setting the transmittance of visible light at from 50 to 70% when the light intensity from outside is high.

PRIOR ART DOCUMENTS

Patent Documents

Patent Document 1: JP-A-2004-175622

DISCLOSURE OF INVENTION

Technical Problem

The double glazing unit disclosed by Patent Document 1 employs the two non-tempered glass plates having a thickness of 5 mm in order to provide window glass for a railway vehicle with a strength appropriate thereto. For this reason, the double glazing unit disclosed by Patent Document 1 has a problem of being heavy.

The strength of glass means resistance to fracture at the time of receiving an impact due to an external force and may be measured a three-point bending test or a four-point bending test in compliance with "JIS R1601 Testing method for flexural strength of fine ceramics".

The double glazing unit disclosed in Patent Document 1, however, has caused a problem in that the temperature of the self-dimming film is increased by the heat of sunlight because the self-dimming film is directly irradiated with the sunlight transmitting through the exterior-side glass plate. The temperature of the exterior-side glass plate could be increased to a temperature close to from 80 to 100° C., in particular, at midsummer. When the double glazing unit is left for a long period of time in such a state, the self-dimming film has caused a problem of having a degraded performance.

In a case of a light-modulating sheet, which is not a self-dimming film, and which changes the light transmittance according to voltage application, such as a suspended particle device (hereinbelow, referred to as SPD: Suspended Particle Device), it is likely that the performance of the light-modulating sheet is degraded at an early stage because the SPD has an upper temperature limit of about from 90 to 100° C. in terms of durability.

The present invention has been proposed in consideration of the above-mentioned circumstances. It is an object of the present invention to provide a double glazing unit which has a light-modulating function of being capable of not only achieving a weight reduction with a required strength maintained but also ensuring the performance of the light-modulating sheet for a long period of time.

Solution to Problem

In order to attain the object, according to an aspect of the present invention (which corresponds to a first embodiment of the present invention), there is provided a double glazing unit including exterior-side laminated glass disposed on an exterior side and interior-side laminated glass disposed on an interior side so as to be apart from each other through a spacer, the spacer having respective lateral sides facing the exterior-side laminated glass and the interior-side laminated glass, the respective lateral sides being bonded to the exterior-side laminated glass and the interior-side laminated glass by use of primary seals, the primary seals having a secondary seal applied on outer sides thereof; wherein the exterior-side laminated glass is configured as laminated glass including a first chemically tempered glass plate, a first interlayer and a second chemically tempered glass plate disposed in this order from the exterior side to the interior side; and wherein the interior-side laminated glass is configured as laminated glass including a glass plate with a heat reflective film disposed thereon, a second interlayer, a light-modulating sheet, a third interlayer, a fourth interlayer and a tempered glass plate disposed in this order from the exterior side to the interior side such that the third interlayer surrounds the light-modulating sheet.

According to the first aspect of the present invention, the exterior-side laminated glass includes the first chemically tempered glass plate, the first interlayer and the second chemically tempered glass plate. Thus, even if the exterior-side laminated glass according to the present invention has a smaller thickness in comparison with the conventional exterior-side glass plates configured as non-tempered glass plates, the exterior-side laminated glass can have a strength substantially equal to that of the conventional exterior-side glass plates.

Further, the interior-side laminated glass includes a glass plate, a second interlayer, a light-modulating sheet, a third interlayer, a fourth interlayer and a tempered glass plate. Thus, even if the interior-side laminated glass according to the present invention has a smaller thickness in comparison with the conventional interior-side glass plates configured as non-tempered glass plates, the interior-side laminated glass can have a strength substantially equal to that of the conventional interior-side glass plates.

Accordingly, according to the first aspect of the present invention, it is possible to achieve a weight reduction with a required strength being maintained.

Furthermore, according to the first aspect of the present invention, the interior-side glass is configured such that the light-modulating sheet is interposed between the second interlayer and the fourth interlayer, the light-modulating sheet has a peripheral edge surrounded by the third interlayer, and the light-modulating sheet has outer sides covered by the glass plate and the tempered glass plate, with the result that the light-modulating sheet, which has a sensitive structure, can be reliably protected. The glass plate can have the heat reflective film disposed thereon to protect the light-modulating sheet from the heat of sunlight.

Accordingly, according to the first aspect of the present invention, it is possible to ensure the performance of the light-modulating sheet for a long period of time. The glass plate of the interior-side laminated glass closer to the exterior side (the glass plate with the heat reflective film disposed thereon) is preferably a non-tempered glass plate.

In order to attain the object, according to another aspect of the present invention (which corresponds to a second embodiment of the present invention), there is provided a double glazing unit comprising exterior-side laminated glass disposed on an exterior side and interior-side laminated glass disposed on an interior side so as to be apart from each other through a spacer, the spacer having respective lateral sides facing the exterior-side laminated glass and the interior-side laminated glass, the respective lateral sides being bonded to the exterior-side laminated glass and the interior-side laminated glass by use of primary seals, the primary seals having a secondary seal applied on outer sides thereof; wherein the exterior-side laminated glass is configured as laminated glass comprising a first chemically tempered glass plate, a first interlayer and a second chemically tempered glass plate disposed in this order from the exterior side to the interior side; and wherein the interior-side laminated glass is configured as laminated glass comprising a glass plate, a second interlayer, a heat reflective sheet, a third interlayer, a light-modulating sheet, a fourth interlayer, a fifth interlayer, and a tempered glass plate disposed in this order from the exterior side to the interior side such that the fourth interlayer surrounds the light-modulating sheet.

The latter aspect of the present invention is a mode wherein the heat reflective film is replaced with the heat reflective sheet. In this case, the glass plate of the interior-side laminated glass that is disposed closer to the exterior side is not limited to a non-tempered glass plate and may be a tempered glass plate. The heat reflective sheet is protected by the second interlayer and the third interlayer since the heat reflective sheet is interposed between the second interlayer and the third interlayer. The light-modulating sheet is protected by the third interlayer, the fourth interlayer and the fifth interlay since the light-modulating sheet is interposed between the third interlayer and the fifth interlayer and because the light-modulating sheet is surrounded at its peripheral edge by the fourth interlayer.

In the double glazing unit according to the former aspect of the present invention, each of the second interlayer, the third interlayer and the fourth interlayer is preferably made of an ethylene-vinyl acetate copolymer.

In the double glazing unit according to the latter aspect of the present invention, each of the second interlayer, the third interlayer, the fourth interlayer and the fifth interlayer is preferably made of an ethylene-vinyl acetate copolymer.

When each of the interlayers is made of an ethylene-vinyl acetate copolymer in each of the aspects, it is possible to minimize equipment cost because it is unnecessary to carry out press-heating treatment by use of an autoclave. Further, the use of an ethylene-vinyl acetate copolymer has no problem caused by a plasticizer leaking out of an interlayer, such as a problem of a plasticizer entering the light-modulating sheet to degrade the light-modulating sheet, because an ethylene-vinyl acetate copolymer contains no plasticizer.

In one mode of the present invention, the first interlayer is preferably made of polyvinyl butyral or an ethylene-vinyl acetate copolymer.

According to one mode of the present invention, the first interlayer of the exterior-side laminated glass having no light-modulating sheet is not limited to be mode of an ethylene-vinyl acetate copolymer and may be made of polyvinyl butyral.

In one mode of the present invention, each of the first chemically tempered glass plate and the second chemically tempered glass plate has a thickness of preferably from 1.2 to 1.8 mm.

According to such one mode of the present invention, the thicknesses of the first chemically tempered glass plate and the second chemically tempered glass plate can be set to at least 1.2 mm to obtain a minimum strength as the exterior-side laminated glass. Although the thicknesses of the first chemically tempered glass plate and the second chemically tempered glass plate may be beyond 1.8 mm, an excessive thickness is unnecessary from the viewpoint of weight reduction and thickness reduction in the exterior-side laminated glass. When both glass plates have a thickness of at most 1.8 mm, it is possible to obtain a sufficient strength.

The preferable thickness ranges of the first and second chemically tempered glass plates are more preferably from 1.3 to 1.6 mm in terms of ensuring a required strength and a weight reduction. For example, when the exterior-side laminated glass includes two chemically tempered glass plates having a thickness of 1.3 mm and an interlayer having a thickness of about 0.76 mm, the exterior-side laminated glass has a strength equal to the strength of a non-tempered glass plate having a thickness of 4 mm. This means that the exterior-side laminated glass according to the present invention may be employed in place of a non-tempered glass plate having a thickness of 4 mm when including such two chemically tempered glass plates and such an interlayer having a total thickness of 3.36 mm (total thickness value obtained by simple addition). Thus, it is possible to achieve a weight reduction with a required strength being maintained.

In one mode of the present invention, the glass plate of the interior-side laminated glass closer to the exterior side preferably comprises a non-tempered glass plate and has a thickness of preferably from 0.1 to 2.0 mm.

According to this mode of the present invention, the non-tempered glass plate functions as a protective layer for the light-modulating sheet. For this reason, the non-tempered glass plate does not need to have an excessive thickness, and the non-tempered glass plate has a thickness set to 0.1 mm as the lower limit such that the non-tempered glass plate can be produced without trouble. On the other hand, the non-tempered glass plate has a thickness set to 2.0 mm as the upper limit such that the non-tempered glass plate can additionally have a function of improving the strength of the interior-side laminated glass while the interior-side laminated glass is made lighter.

In one mode of the present invention, the tempered glass plate of the interior-side laminated glass closer to the interior side has a thickness of preferably from 2.0 to 3.0 mm.

According to this mode of the present invention, the tempered glass plate can have a thickness of at least 2.0 mm to obtain a strength suitable for the interior-side laminated glass. Further, the tempered glass plate can have a thickness of at most 3.0 mm to make the interior-side laminated glass lighter. It should be noted that the tempered glass plate may be chemically tempered or tempered by air quenching.

In one mode of the present invention, the tempered glass plate of the interior-side laminated glass closer to the interior side is preferably a chemically tempered glass plate. The use of a chemically tempered glass plate is helpful to provide a sufficient strength to the interior-side laminated glass and to further reduce the thickness of the interior-side laminated glass.

Thus, even if the interior-side laminated glass according to the present invention has a smaller thickness in comparison with the conventional interior-side laminated glass plates configured as non-tempered glass plates, the interior-side laminated glass can have a strength substantially equal to that of the conventional interior-side laminated glass plates.

In one mode of the present invention, the light-modulating sheet includes a light-modulating element which is preferably a suspended particle device element, an electrochromic element or a liquid crystal element.

Advantageous Effects of Invention

In accordance with the double glazing unit with the present invention applied thereto, it is possible not only to achieve a weight reduction with a required strength maintained but also to ensure the performance of the light-modulating sheet for a long period of time as described above.

DESCRIPTION OF EMBODIMENTS

Now, preferred embodiments of the double glazing unit according to the present invention will be described in reference to the accompanying drawings.

Figure 1:
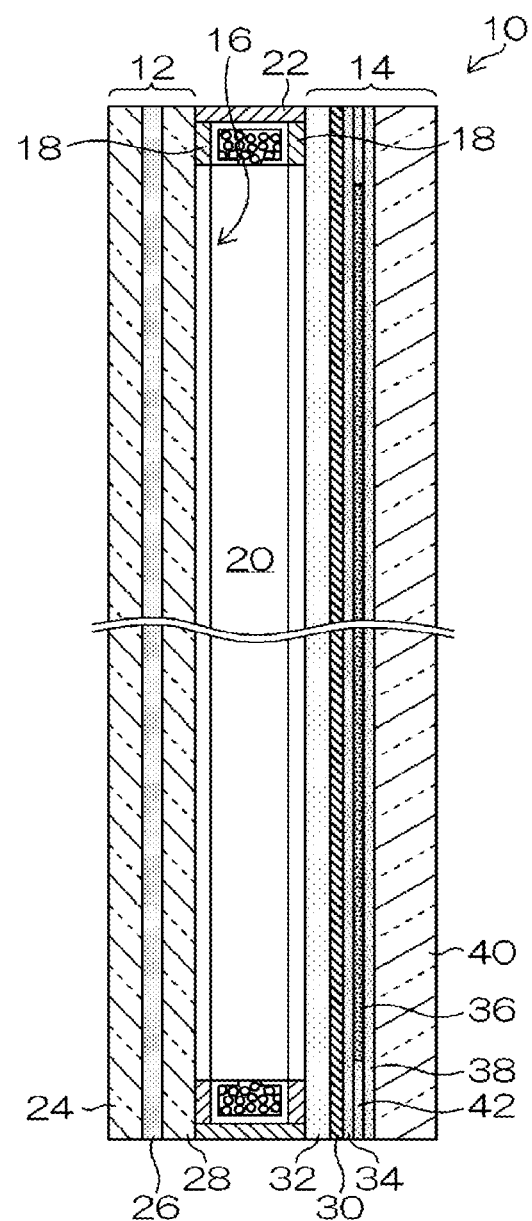
FIG. 1 is a cross-sectional view of the double glazing unit according to a first embodiment of the present invention, which is applied to window glass for a railway vehicle.
Figure 2:
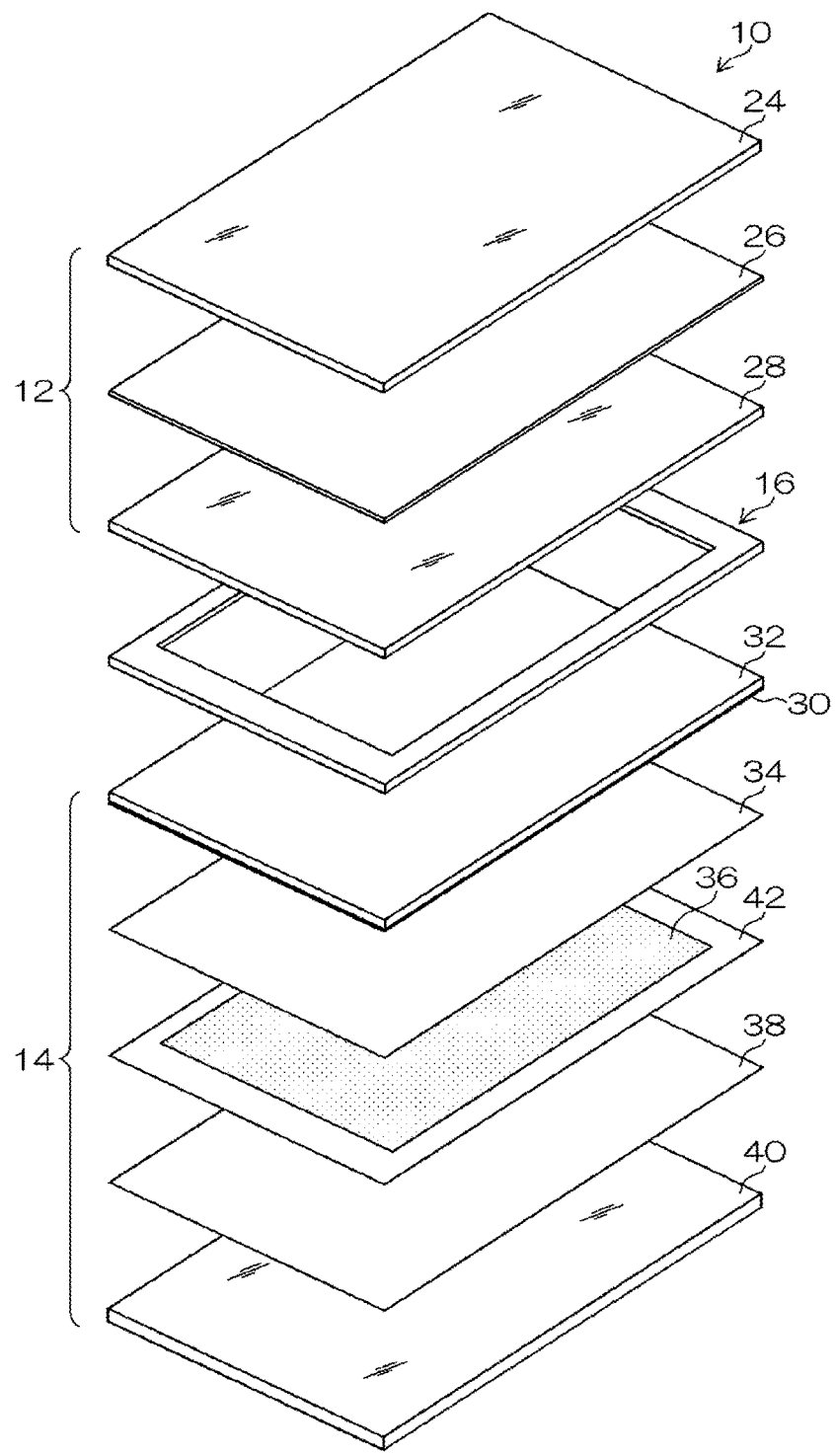
FIG. 2 is an exploded perspective view of the double glazing unit shown in FIG. 1 where respective members constituting the double glazing unit are shown, being separated from one another.
Figure 3:
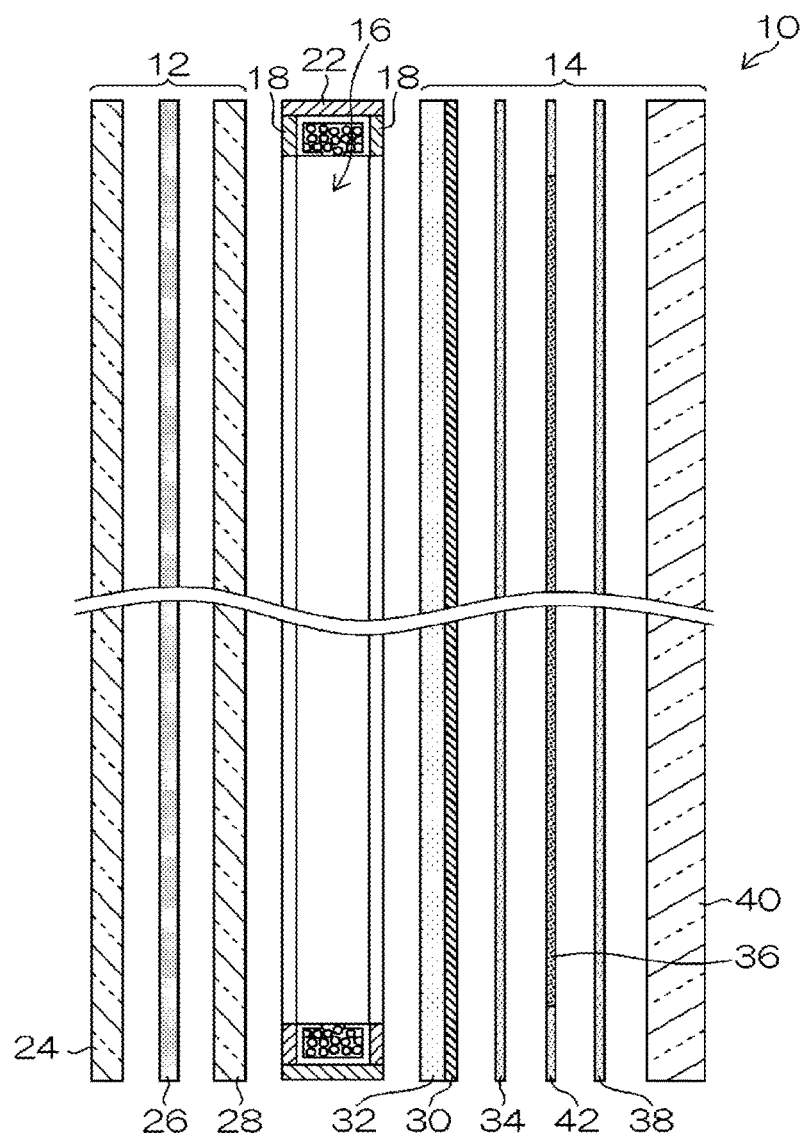
FIG. 3 is a longitudinal cross-sectional view of the double glazing unit shown in FIG. 1 where respective members constituting the double glazing unit are shown, being separated from one another.

FIG. 1 is a cross-sectional view of the double glazing unit 10 according to a first embodiment of the present invention, which is applied to window glass for a railway vehicle. FIG. 2 is an exploded perspective view of the double glazing unit 10 shown in FIG. 1 where respective members constituting the double glazing unit 10 are shown, being separated from one another. FIG. 3 is a longitudinal cross-sectional view of the double glazing unit 10 where respective members constituting the double glazing unit 10 are shown, being separated from one another.

First, the basic structure of the double glazing unit 10 according to the first embodiment will be described.

[Basic Structure of Double Grazing Unit 10 According to First Embodiment]

The double glazing unit 10 includes an exterior-side laminated glass 12 formed in a rectangular shape, an interior-side laminated glass 14 formed in a rectangular shape, and a spacer 16 formed in a frame shape. The exterior-side laminated glass 12 and the interior-side laminated glass 14 are equal to each other in terms of the size of their surface areas and are disposed, being separated from each other through the spacer 16. The spacer 16 has respective lateral sides facing the exterior-side laminated glass 12 and the interior-side laminated glass 14 such that the respective lateral sides are bonded to the exterior-side laminated glass 12 and the interior-side laminated glass 14 by butyl rubber members (primary seals) 18. In this manner, between the exterior-side laminated glass 12 and the interior-side laminated glass 14 is formed a hollow space 20 (see FIG. 1). The butyl rubber members 18 have a silicone sealing material (secondary seal) 22 applied to outer peripheral portions. Thus, the double glazing unit 10 is configured.

[Exterior-Side Laminated Glass 12]

The exterior-side laminated glass 12 is configured as laminated glass having a chemically tempered glass plate (first chemically tempered glass plate) 24, an interlayer (first interlayer) 26 and a chemically tempered glass plate (second chemically tempered glass plate) 28 disposed in this order from an exterior side to an interior side.

[Interior-Side Laminated Glass 14]

The interior-side laminated glass 14 is configured as laminated glass having a glass plate 32 (particularly preferably non-tempered glass plate 32) with a heat reflective film 30 disposed thereon, an interlayer (second interlayer) 34, a light-modulating sheet 36, an interlayer (fourth interlayer) 38 and a tempered glass plate 40 (particularly preferably chemically-tempered glass plate 32) disposed in this order from the exterior side to the interior side. Between the second interlayer 34 and the fourth interlayer 38 is interposed an interlayer (third interlayer) 42, which is formed in a frame shape so as to surround the light-modulating sheet 36. This arrangement prevents the light-modulating sheet 36 from being exposed at its end faces. It should be noted that the chemically tempered glass plate 40 may be replaced with a glass plate tempered by air quenching.

<Chemically-Tempered Glass Plates 24, 28 and 40>

The chemically-tempered glass plates 24, 28 and 40 are glass plates tempered by a chemical tempering method. The chemical tempering method is a technique that alkali metal ions existing on the surface of a glass plate and having a small ion diameter (typically Li ions or Na ions) are exchanged for alkali ions having a larger ion diameter (typically Na ions or K ions for Li ions, or K ions for Na ions) by ion exchange at a lower temperature than the glass transitional point to chemically temper the glass plate.

The chemically tempered glass plates 24 and 28 have a thickness of preferably from 1.2 to 1.8 mm for the purposes of obtaining a strength required as the exterior-side laminated glass 12 and of achieving weight reduction. The chemically tempered glass plate 40 has a thickness of preferably from 2.0 to 3.0 mm for the purposes of obtaining a strength required as the interior-side laminated glass 14 and of achieving weight reduction.

<Interlayers 26, 34 and 38>

Each of the interlayers 26, 34 and 38, which function as bonding layers for the double glazing unit 10, may be an interlayer made of polyvinyl butyral (hereinbelow, referred to as the PVB (Polyvinyl butyral)-based interlayer) or an interlayer made of an ethylene-vinyl acetate copolymer (hereinbelow, referred to as the EVA (Ethylene-Vinyl Acetate)-based interlayer), each of which is employed in laminated glass.

Each of the interlayers 34 and 38 may be, however, an EVA-based interlayer containing no plasticizer rather than a PVB-based interlayer containing a plasticizer in order to protect the light-modulating sheet 36, which has a sensitive structure susceptible to degradation in performance by a plasticizer.

With regard to the interlayers 26, 34 and 38, ones having various kinds of thicknesses are commercially available. Plural interlayers having the same thickness as one another or having different thicknesses can be stacked to easily control the thicknesses of the exterior-side laminated glass 12 and the interior-side laminated glass 14. For example, the interlayers 26, 34 and 38 have a thickness of from 0.1 to 1.0 mm.

If the double glazing unit 10 has an end face exposed, EVA-based interlayers are more preferable than PVB-based interlayers because of having a higher water resistance (smaller influence from water). The EVA-based interlayers are advantageous in terms of production cost because of being capable of dispensing with an autoclave and having excellent adhesiveness and transparency.

<Heat Reflective Film 30>

The heat reflective film 30 is a transparent heat reflective layer reflecting infrared rays (such as, a metal layer made of e.g. silver, a heat reflective layer formed by alternately laminating oxide layers and metal layers, or heat reflective layer formed by alternately laminating high refractive index layers and low refractive index layers). The heat reflective film may be disposed on an interior side of the non-tempered glass plate 32 by a film deposition method, such as sputtering.

The heat reflective film 30 may be disposed on a side of the non-tempered glass plate 32 closer to the interlayer 34 or be disposed on a side of the non-tempered glass plate 32 closer to the hollow space 20. It should be note that the heat reflective film 30 is preferably disposed on the side of the non-tempered glass plate 32 closer to the interlayer 34 because of being susceptible to be degraded by moisture.

The higher the infrared reflectivity of the heat reflective layer 30 is, the more it is preferred. The heat reflective layer normally has a heat reflectivity of about from 40 to 50%. The heat reflective layer can sufficiently control a temperature increase in the light-modulating sheet 36 caused by sunlight, even having such a degree of heat reflectivity, such that the heat reflective layer can protect the light-modulating sheet 36 from sunlight.

<Glass Plate 32>

The glass plate 32 is preferably a non-tempered glass plate 32 for the reason described later. The non-tempered glass plate 32 is normal float glass, which is not subjected to tempering treatment.

The non-tempered glass plate 32 has a thickness of preferably at least 0.1 mm in terms of protecting the light-modulating sheet 36, and preferably at most 2.0 mm in terms of weight reduction in the interior-side laminated glass 14.

<Light-Modulating Sheet 36>

Various kinds of light-modulating sheets are available for the light-modulating sheet 36. The SPD as one example of the light-modulating sheet 36 is produced by disposing, between two polyethylene terephthalate (PET) films with a transparent conductive film coated on each of the films, a droplet having a diameter of several micrometers with dispersed particles capable of being subjected to alignment therein, and aligning the particles by transmission/stop of electric signals such that the light transmission can be controlled so as to switch between a deep blue state and a transparent state.

The light-modulating sheet 36 may be, for example, a known sheet having an electrochromic element (light-modulating element) between two transparent substrates or a known sheet having a liquid crystal element (light-modulating element) encapsulated therein. For example, the light-modulating sheet 36 has a thickness of from 0.2 to 0.8 mm. The interlayer 42 formed in a frame shape may be formed by stacking plural layers as required so as to have a thickness equal to that of the light-modulating sheet 36.

[Process for Producing Double Glazing Unit 10]

<Process for Producing Exterior-Side Laminated Glass 12>

In the process for producing the exterior-side laminated glass 12 by employing a PVB-based interlayer as the interlayer 26, the chemically tempered glass plate 24, the interlayer 26 and the chemically tempered glass plate 28 are laminated to form a laminate, the laminate is encapsulated in a vacuum bag, and the laminate is preliminarily heated at about 130° C., being encapsulated in the vacuum bag. After that, the laminate thus preliminarily heated is pressurized, being heated at a temperature of from 100 to 150° C. by use of a known autoclave. Thus, the exterior-side laminated glass 12 is produced, employing the PVB-based interlayer.

On the other hand, in the process for producing the exterior-side laminated glass 12 by employing an EVA-based interlayer as the interlayer 26, it is unnecessary to carry out press-heating treatment by use of an autoclave. Specifically, the exterior-side laminated glass may be produced by laminating the chemically tempered glass plate 24, the interlayer 26 and the chemically tempered glass plate 28 to form a laminate, encapsulating the laminate in a vacuum bag, and immersing the vacuum bag in hot water to heat the laminate.

<Process for Producing Interior-Side Laminated Glass 14>

The interior-side laminated glass may be produced by laminating the non-tempered glass plate 32, the interlayer 34, the light-modulating sheet 36, the interlayer 42, the interlayer 38 and the chemically tempered glass plate 40 to form a laminate, encapsulating the laminate in a vacuum bag, and immersing the vacuum bag in hot water to heat the laminate.

The use of the PVB-based interlayers has a problem of increasing equipment cost because it is necessary to carry out treatment by use of an autoclave. Further, the presence of a plasticizer contained in PVB may create a problem where the plasticizer, which has leaked out of a PVB-based interlayer, enters the light-modulating layer (light-modulating element) of the light-modulating sheet 36 to degrade the inside of the light-modulating layer.

To the contrast, the use of the EVA-based interlayers can minimize equipment cost because it is unnecessary to carry out treatment by use of an autoclave. The use of the EVA-based interlayers has an advantage of being free from the above-mentioned problem caused by a plasticizer because the EVA-based interlayers contain no plasticizer. For these reasons, it is preferred to employ EVA-based interlayers as the interlayers 26, 34, 38 and 42.

Next, the features of the double glazing unit 10 according to the first embodiment of the present invention will be described.

<<Features of Double Glazing Unit 10>>

A first feature is that the exterior-side laminated glass 12 includes the chemically tempered glass plate 24, the interlayer 26 and the chemically tempered glass plate 28. Thus, even if the exterior-side laminated glass 12 has a smaller thickness than the conventional exterior-side laminated glass plates configured as non-tempered glass plates, the exterior-side laminated glass can have a strength substantially equally to that of the conventional exterior-side laminated glass plates.

A second feature is that the interior-side laminated glass 14 includes the glass plate 32, the interlayer 34, light-modulating sheet 36, the interlayer 42, the interlayer 38 and the chemically tempered glass 40. Thus, even if the interior-side laminated glass 14 has a smaller thickness than the conventional interior-side glass plates configured as non-tempered glass plates, the interior-side laminated glass can have a strength substantially equal to that of the conventional interior-side glass plates. It should be noted that the glass plate 32 is preferably a non-tempered glass plate 32 for the reason described later on.

Thus, in accordance with the double glazing unit 10 according to the first embodiment, it is possible to achieve a weight reduction with a required strength maintained.

Further, the interior-side laminated glass is configured such that the light-modulating sheet 36 is interposed between the interlayer 34 and the interlayer 38, that the light-modulating sheet 36 has the peripheral edge surrounded by the interlayer 42 and that the light-modulating sheet has the outer sides covered by the non-tempered glass plate 32 and the tempered glass plate 40 (in particular, chemically tempered glass plate 40). Thus, the light-modulating sheet 36, which has a sensitive structure, can be reliably protected from an external force. Further, the light-modulating sheet 36 can be protected from the heat of the sunlight since the heat reflective film 30 is disposed on the non-tempered glass plate 32.

Thus, in accordance with the double glazing unit 10 according to the first embodiment, it is possible to ensure the performance of the light-modulating sheet 36 for a long period of time.

Now, the reason why the glass plate that has the heat reflective film 30 deposited thereon is the non-tempered glass plate 32, not a chemically tempered glass plate, will be described.

When the heat reflective film 30 is disposed on a glass plate prior to chemical tempering, followed by chemically tempering the glass plate, the heat reflective film is adversely affected by the ion exchange treatment process to be subjected to a degradation in performance in some cases. On the other hand, when the heat reflective film 30 is disposed on a chemically tempered glass plate, the chemically tempered glass plate is adversely affected by heat caused by heat treatment during the heat treatment in the disposition process, causing a problem in that the chemically tempered glass plate is subjected to a decrease in strength (alleviations in the tensile stresses and the compressive stresses in the glass plate). For these reason, the non-tempered glass plate 32 is employed as the glass plate with the heat reflective film 30.

It should be noted that an air quenched tempered glass plate, which is produced an air quench tempering method, is applicable in place of the chemically tempered glass plate 40. The glass plate subjected to air quench tempering is, however, produced prerequisite that the glass plate has a greater thickness than a glass plate subjected to chemically tempering. For this reason, it becomes difficult to achieve a weight reduction in the double glazing unit. Although a glass plate tempered by air quenching is three times stronger in comparison with a normal glass plate (float glass) in strength, a chemically tempered glass plate is preferred to be employed because of being five times stronger in strength.

Further, although a glass plate tempered by air quenching has a problem of poor appearance caused by a trace formed on a glass surface by air blowing, a chemically tempered glass plate has an advantage of having good appearance because such a trace is not left on it.

Another feature of the double glazing unit 10 according to the present invention is that the chemically tempered glass plates 24 and 28 have a thickness set to from 1.2 to 1.8 mm.

Specifically, when the chemically tempered glass plates 24 and 28 have a thickness set to at least 1.2 mm, it is possible to obtain a minimum strength required as the exterior-side laminated glass 12. Although the thicknesses of the chemically tempered glass plates 24 and 28 may be beyond 1.8 mm, an excessive thickness is unnecessary from the viewpoint of weight reduction and thickness reduction in the exterior-side laminated glass 12. When both glass plates have a thickness of at most 1.8 mm, it is possible to obtain a sufficient strength.

The preferable thickness ranges of the chemically tempered glass plates 24 and 28 are more preferably from 1.3 to 1.6 mm in terms of ensuring a require strength and a weight reduction. For example, when the exterior-side laminated glass 12 includes two chemically tempered glass plates having a thickness of 1.3 mm and an interlayer 26 having a thickness of about 0.76 mm, the exterior-side laminated glass has a strength equal to the strength of a non-tempered glass plate having a thickness of 4 mm. This means that the exterior-side laminated glass 12 having a total thickness of 3.36 mm (total thickness value obtained by simple addition) may be employed in place of a non-tempered glass plate having a thickness of 4 mm. Thus, it is possible to achieve a weight reduction with a required strength being maintained. It should be noted that the presence of the interlayer 26 does not inhibit a weight reduction because the mass ratio of the interlayer 26 to the glass is about 10%.

Another feature of the double glazing unit 10 according to the present invention is that the non-tempered glass plate 32 has a thickness set to from 0.1 to 2.0 mm.

The non-tempered glass plate 32 functions as a protective layer for the light-modulating sheet 36. For this reason, the non-tempered glass plate does not need to have an excessive thickness, and the non-tempered glass plate has a thickness set to 0.1 mm as a lower limit such that the non-tempered glass plate can be produced without trouble. On the other hand, the non-tempered glass plate 32 has a thickness set to 2.0 mm as the upper limit such that the non-tempered glass plate 32 can additionally have a function of improving the strength of the interior-side laminated glass 14 while the interior-side laminated glass 14 is made lighter.

Another feature of the double glazing unit 10 according to the present invention is that the tempered glass plate 40 of the interior-side laminated glass 12 closer to the interior side has a thickness set to from 2.0 to 3.0 mm.

Because the tempered glass plate 40, particularly preferably the chemically tempered glass plate 40, has a thickness of at least 2.0 mm, it is possible to obtain a strength suitable for the interior-side laminated glass 14. Further, it is possible to make the interior-side laminated glass 14 lighter because the tempered glass plate 40, particularly preferably the chemically tempered glass plate 40, has a thickness of at most 3.0 mm.

[Mass Comparison]

A product as a Comparative Example and a product as an Example were produced so as to be equal in strength and surface area (0.5 $m^2$), and their masses were compared.

<Product as Comparative Example>
Exterior-side glass plate: non-tempered glass plate having a thickness of 4 mm
Interior-side glass plate: non-tempered glass plate having a thickness of 5 mm
Spacer: made of aluminum and having a thickness of 9 mm
Double glazing unit: total thickness of 18 mm
Mass of double glazing unit:14.0 kg (excluding the spacer)
<Double Glazing Unit According to First Embodiment as Example>
Exterior-side laminated glass 12: including a chemically tempered glass plate 24 having a thickness of 1.3 mm, an interlayer 26 having a thickness of 0.76 mm and a chemically tempered glass plate 28 having a thickness of 1.3 mm
Interior-side laminated glass 14: including a non-tempered glass plate 32 having a thickness of 1.6 mm, an interlayer 34 having a thickness of 0.4 mm, a light-modulating sheet having a thickness of 0.4 mm, an interlayer 38 having a thickness of 0.4 mm and a chemically tempered glass plate 40 having a thickness of 2.5 mm
Spacer 16: made of aluminum and having a thickness of 9 mm
Double glazing unit: having a total thickness of 17.7 mm
Mass of double glazing unit 10: 10.3 kg (excluding the spacer 16)
As shown above, in accordance with the double glazing unit 10 of the embodiment, it was possible to achieve about 26.5% of weight reduction as the mass of the glass plates while a required strength being maintained, in comparison with such a conventional double glazing unit.

<<Structure of Double Grazing Unit 50 According to Second Embodiment>>

Figure 4:
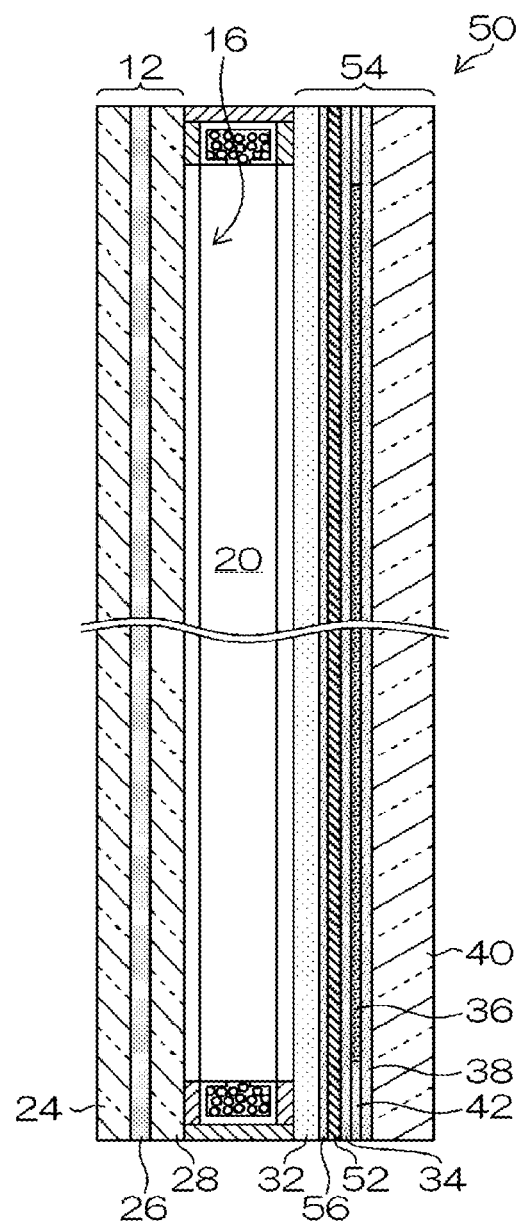
FIG. 4 is a cross-sectional view of the double glazing unit according to a second embodiment of the present invention, which is applied to window glass for a railway vehicle.
Figure 5:
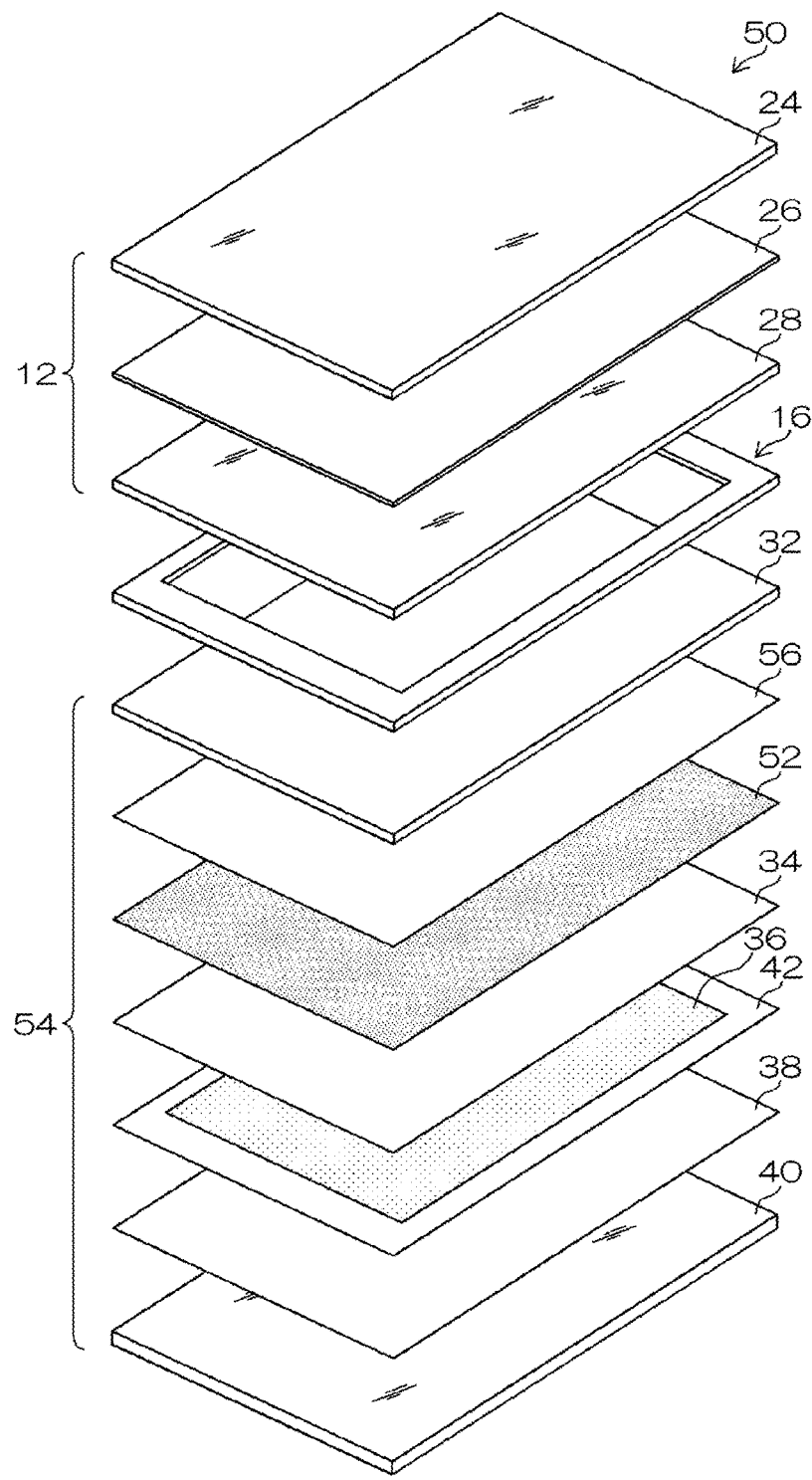
FIG. 5 is an exploded perspective view of the double glazing unit shown in FIG. 4 where respective members constituting the double glazing unit are shown, being separated from one another.
Figure 6:
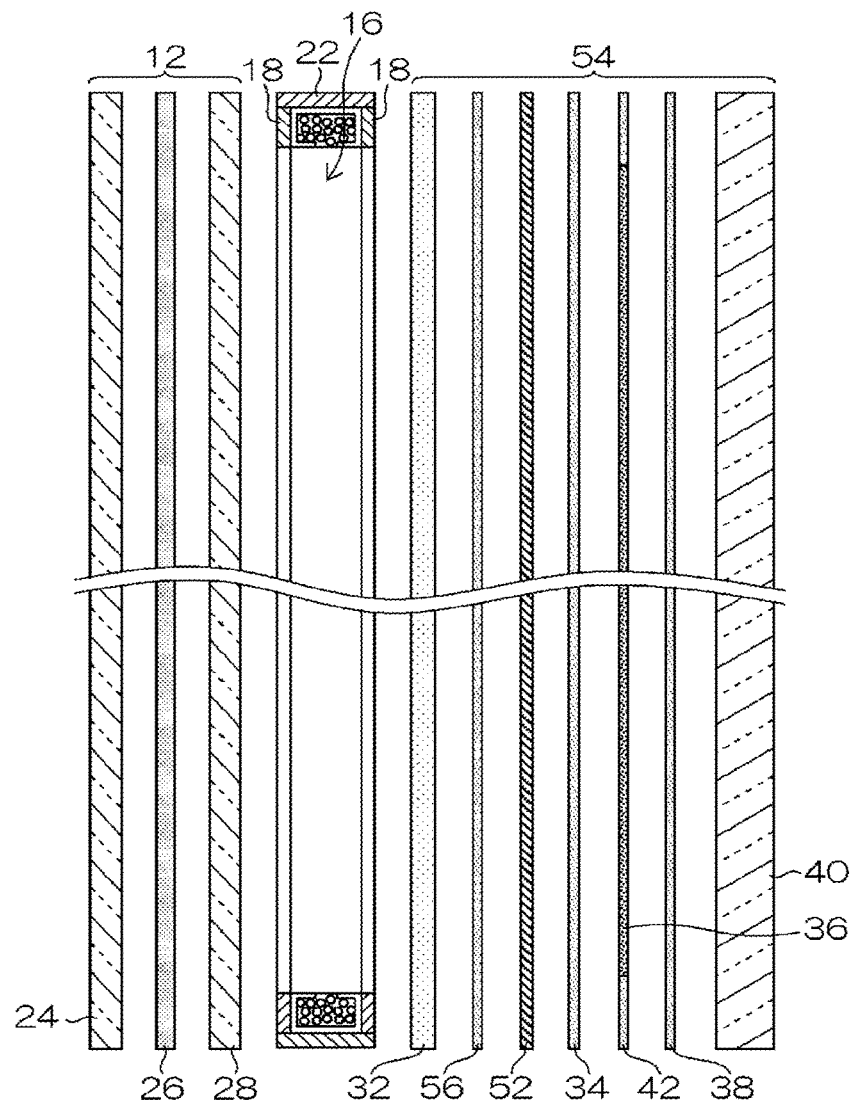
FIG. 6 is a longitudinal cross-sectional view of the double glazing unit shown in FIG. 4 where respective members constituting the double glazing unit are shown, being separated from one another.

FIG. 4 is a cross-sectional view of the double glazing unit 50 according to a second embodiment of the present invention. FIG. 5 is an exploded perspective view of the double glazing unit 50 shown in FIG. 4 where respective members constituting the double glazing unit 50 are shown, being separated from one another. FIG. 6 is a longitudinal cross-sectional view of the double glazing unit 50 where respective members constituting the double glazing unit 50 are shown, being separated from one another.

When the double glazing unit 50 according to the second embodiment will be described, identical members and similar members to those of the double glazing unit 10 according to the first embodiment are denoted by like reference numerals, and the explanation and the effects of these members will be omitted. In other words, only differences of the double glazing unit according to the second invention from the double glazing unit 10 according to the first invention will be described.

A feature is that the double glazing unit 50 employs a heat reflective sheet 52 in place of the heat reflective film 30 of the double glazing unit 10.

Specifically, the double glazing unit 50 has an interior-side laminated glass 54 which is configured as laminated glass including a glass plate 32, an interlayer (second interlayer) 56, the heat reflective sheet 52, an interlayer (third interlayer) 34, a light-modulating sheet 36, an interlayer (fourth interlayer) 42, an interlayer (fifth interlayer) 38 and a tempered glass plate 40 (particularly preferably a chemically tempered glass plate 40). It should be noted that the interlayer 56 is also an EVA-based interlayer.

In the double glazing unit 50 according to the second embodiment, the glass plate 32 may be a non-tempered glass plate or a tempered glass plate (in particular, a chemically tempered glass plate in terms of a further reduction in thickness) because the glass plate 32 has no heat reflective film disposed thereon.

According to the interior-side laminated glass 54, the heat reflective sheet 52 is protected by the interlayer 56 and the interlayer 34 since the heat reflective sheet 52 is interposed between the interlayer 56 and the interlayer 34. Further, the light-modulating sheet 36 is protected by the interlayer 34 and the interlayer 38 since the light-modulating sheet 36 is interposed between the interlayer 34 and the interlayer 38.

<Heat Reflective Sheet 52>

Although the heat reflective sheet 52 may be, for example, a sheet prepared by disposing, on a transparent sheet made of e.g. PET, a transparent heat reflective layer reflecting infrared rays (such as, a metal layer made of e.g. silver), the heat reflective sheet is not limited to the just above mentioned one.

In other words, any sheet is applicable as the heat reflective sheet 52 as long as it has a function of reflecting infrared rays of sunlight to control a temperature increase in the light-modulating sheet 36. Examples of the heat reflective sheet include one having oxide layers and metal layers alternately laminated on a transparent sheet so as to form a heat reflective layer, and one having high refractive index layers and low refractive index layers alternately laminated on a transparent sheet so as to form a heat reflective layer.

The higher the infrared reflectivity of the heat reflective layer is, the more it is preferred. The heat reflective sheet normally has a heat reflectivity of from about 40 to 50%. The heat reflective layer can sufficiently control a temperature increase in the light modulating sheet 36, even having such a degree of heat reflectivity. For example, the heat reflective sheet 52 has a thickness of from 0.01 to 0.15 mm The mass of the double glazing unit 50 to the second embodiment is substantially equal to that of the double grazing unit 10 according to the first embodiment. Thus, in accordance with the double glazing unit 50, it was possible to achieve a weight reduction with a required strength being maintained, in comparison with the conventional product as the Comparative Example.

INDUSTRIAL APPLICABILITY

Although, in these embodiments, the double glazing unit 10 applied to window glass for a railway vehicle is exemplified as the double glazing unit according to the present invention, the double glazing unit according to the present invention is not limited to such an application. For example, the double glazing unit according to the present invention may be also applied to window glass for a building, and window glass for e.g. an airplane or a ship.

This application is a continuation of PCT Application No. PCT/JP2014/070112, filed on Jul. 30, 2014, which is based upon and claims the benefit of priority from Japanese Patent Application No. 2013-162629 filed on Aug. 5, 2013. The contents of those applications are incorporated herein by reference in their entireties.

REFERENCE SYMBOLS

10: double glazing unit, 12: exterior-side laminated glass, 14: interior-side laminated glass, 16: spacer, 18: primary seal, 20: hollow space, 22: secondary seal, 24: first chemically tempered glass plate, 26: first interlayer, 28: second chemically tempered glass plate, 30: heat reflective film, 32: glass plate, 34: second interlayer, 36: light-modulating sheet, 38: fourth interlayer, 40: tempered glass plate, 42: third interlayer, 50: double glazing unit, 52: heat reflective sheet, 54: interior-side laminated glass, 56: interlayer

What is claimed is:

1. A double glazing unit comprising exterior-side laminated glass disposed on an exterior side and interior-side laminated glass disposed on an interior side so as to be apart from each other through a spacer, the spacer having respective lateral sides facing the exterior-side laminated glass and the interior-side laminated glass, the respective lateral sides being bonded to the exterior-side laminated glass and the interior-side laminated glass by use of primary seals, the primary seals having a secondary seal applied on outer sides thereof;

wherein the exterior-side laminated glass is configured as laminated glass comprising a first chemically tempered glass plate, a first interlayer and a second chemically tempered glass plate disposed in this order from the exterior side to the interior side; and wherein the interior-side laminated glass is configured as laminated glass comprising a glass plate with a heat reflective film disposed thereon, a second interlayer, a light-modulating sheet, a third interlayer, a fourth interlayer and a tempered glass plate disposed in this order from the exterior side to the interior side such that the third interlayer surrounds the light-modulating sheet.

2. A double glazing unit comprising exterior-side laminated glass disposed on an exterior side and interior-side laminated glass disposed on an interior side so as to be apart from each other through a spacer, the spacer having respective lateral sides facing the exterior-side laminated glass and the interior-side laminated glass, the respective lateral sides being bonded to the exterior-side laminated glass and the interior-side laminated glass by use of primary seals, the primary seals having a secondary seal applied on outer sides thereof;

wherein the exterior-side laminated glass is configured as laminated glass comprising a first chemically tempered glass plate, a first interlayer and a second chemically tempered glass plate disposed in this order from the exterior side to the interior side; and wherein the interior-side laminated glass is configured as laminated glass comprising a glass plate, a second interlayer, a heat reflective sheet, a third interlayer, a light-modulating sheet, a fourth interlayer formed in a frame shape, a fifth interlayer, and a tempered glass plate disposed in this order from the exterior side to the interior side such that the fourth interlayer surrounds the light-modulating sheet.

3. The double glazing unit according to claim 1, wherein each of the second interlayer, the third interlayer and the fourth interlayer is made of an ethylene-vinyl acetate copolymer.

4. The double glazing unit according to claim 2, wherein each of the second interlayer, the third interlayer, the fourth interlayer and the fifth interlayer is made of an ethylene-vinyl acetate copolymer.

5. The double glazing unit according to claim 1, wherein the first interlayer is made of polyvinyl butyral or an ethylene-vinyl acetate copolymer.

6. The double glazing unit according to claim 1, wherein each of the first chemically tempered glass plate and the second chemically tempered glass plate has a thickness of from 1.2 to 1.8 mm.

7. The double glazing unit according to claim 1, wherein the glass plate of the interior-side laminated glass closer to the exterior side comprises a non-tempered glass plate and has a thickness of from 0.1 to 2.0 mm.

8. The double glazing unit according to claim 1, wherein the tempered glass plate of the interior-side laminated glass closer to the interior side has a thickness of from 2.0 to 3.0 mm.

9. The double glazing unit according to claim 1, wherein the tempered glass plate of the interior-side laminated glass closer to the interior side comprises a chemically tempered glass plate.

10. The double glazing unit according to claim 1, wherein the light-modulating sheet includes a light-modulating element which comprises a suspended particle device element, an electrochromic element or a liquid crystal element.

11. The double glazing unit according to claim 2, wherein the first interlayer is made of polyvinyl butyral or an ethylene-vinyl acetate copolymer.

12. The double glazing unit according to claim 2, wherein each of the first chemically tempered glass plate and the second chemically tempered glass plate has a thickness of from 1.2 to 1.8 mm.

13. The double glazing unit according to claim 2, wherein the glass plate of the interior-side laminated glass closer to the exterior side comprises a non-tempered glass plate and has a thickness of from 0.1 to 2.0 mm.

14. The double glazing unit according to claim 2, wherein the tempered glass plate of the interior-side laminated glass closer to the interior side has a thickness of from 2.0 to 3.0 mm.

15. The double glazing unit according to claim 2, wherein the tempered glass plate of the interior-side laminated glass closer to the interior side comprises a chemically tempered glass plate.

16. The double glazing unit according to claim 2, wherein the light-modulating sheet includes a light-modulating element which comprises a suspended particle device element, an electrochromic element or a liquid crystal element.

* * * * *